(12) United States Patent
Urbanski et al.

(10) Patent No.: US 6,390,454 B1
(45) Date of Patent: May 21, 2002

(54) MULTIPLE DOWNCOMER FRACTIONATION TRAYS WITH LIQUID DISTRIBUTION DEVICES ON ENDS OF DOWNCOMERS

(75) Inventors: Nicholas F. Urbanski, DePew; Zhanping Xu, Williamsville, both of NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/585,751

(22) Filed: Jun. 2, 2000

(51) Int. Cl.[7] .................................................. B01F 3/04
(52) U.S. Cl. ........................ 261/114.1; 261/97; 203/71
(58) Field of Search ...................... 261/114.1, 114.5, 261/97; 202/158; 203/71

(56) References Cited

U.S. PATENT DOCUMENTS

| | | | |
|---|---|---|---|
| 3,410,540 A | | 11/1968 | Bruckert .................... 261/113 |
| 4,159,291 A | * | 6/1979 | Bruckert et al. .......... 261/114.1 |
| 4,226,678 A | * | 10/1980 | Mende et al. ............. 261/114.5 |
| 4,744,929 A | * | 5/1988 | Robinson et al. ......... 261/114.1 |
| 5,209,875 A | | 5/1993 | Miller et al. .............. 261/114.1 |
| 5,223,183 A | * | 6/1993 | Monkelbaan et al. ..... 261/114.1 |
| 5,244,604 A | * | 9/1993 | Miller et al. .............. 261/114.1 |
| 5,318,732 A | * | 6/1994 | Monkelbaan et al. ..... 261/114.1 |
| 5,573,714 A | * | 11/1996 | Monkelbaan et al. ..... 261/114.1 |
| 6,116,583 A | * | 9/2000 | Agnello .................... 261/114.5 |

OTHER PUBLICATIONS

Sloley, A.W. *High–Capacity Distillation* Hydrocarbon Processing, Aug. 1998 pp. 53–96.
Sloley, A.W. *Should You Switch to High Capacity Trays?*Chemical Engineering Progress, Jan. 1999 pp. 23–35.

* cited by examiner

*Primary Examiner*—C. Scott Bushey
(74) *Attorney, Agent, or Firm*—John G. Tolomei; John F. Spears, Jr.

(57) ABSTRACT

Liquid distributors collect liquid falling out of the spout group at the ends of a downcomer of a fractionation tray. The devices then distribute the liquid against the wall of the column or onto the decking of the next lower tray so to cause uniform liquid flows across the terminal decking section of the next lower multiple downcomer tray. The apparatus improves the liquid flow path on the terminal decking section of the tray, thus increasing the overall efficiency of the tray.

3 Claims, 3 Drawing Sheets

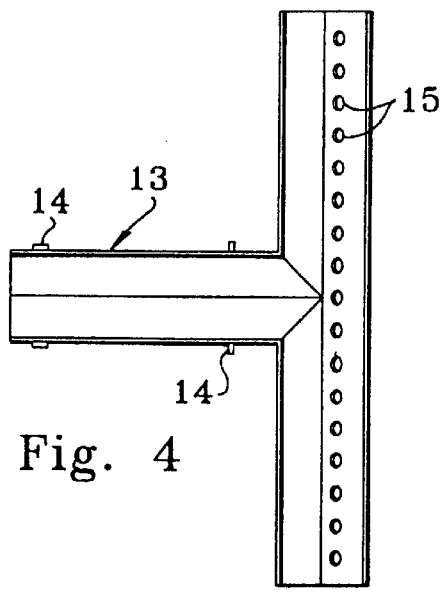
Fig. 4
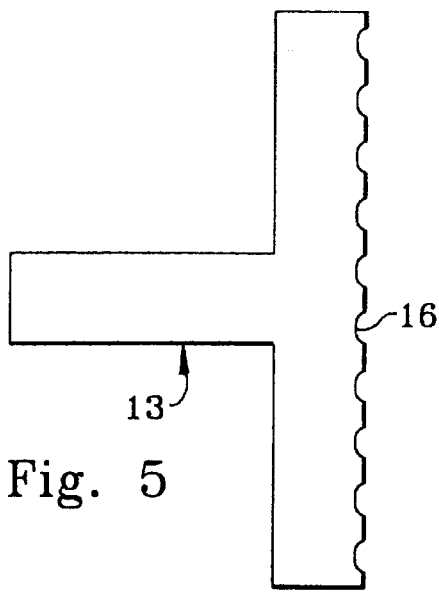
Fig. 5
Fig. 6
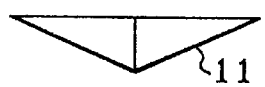
Fig. 8
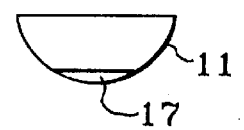
Fig. 7
Fig. 9
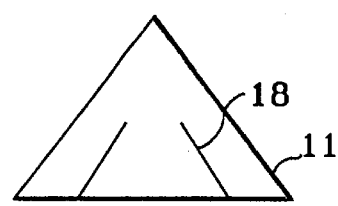
Fig. 10
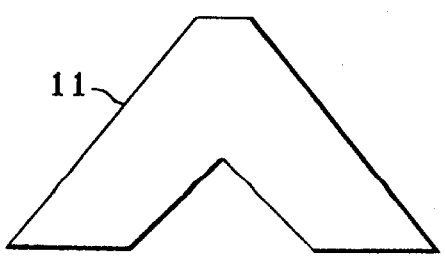
Fig. 11
Fig. 12
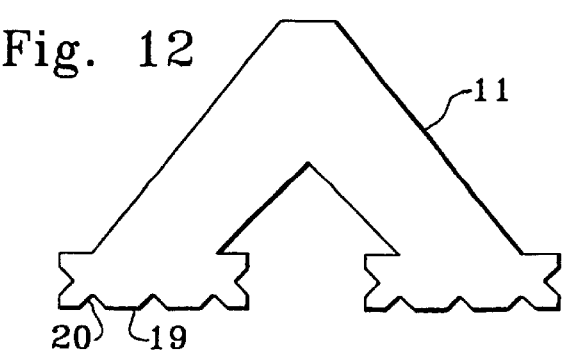

MULTIPLE DOWNCOMER FRACTIONATION TRAYS WITH LIQUID DISTRIBUTION DEVICES ON ENDS OF DOWNCOMERS

BACKGROUND OF THE INVENTION

1. Field of the Invention

The invention relates to an apparatus for increasing the efficiency of fractional distillation trays. The invention more specifically relates to a process and apparatus providing a higher efficiency multiple downcomer fractionation tray.

2. Related Art

Multiple downcomer fractionation trays were introduced by U.S. Pat. No. 3,410,540 issued to W. Bruckert. This reference describes the characteristic arrangement of a multiple downcomer tray which includes long narrow trough-like downcomers spread across the tray with long rectangular areas of tray decking separating the downcomers. The traditional rectangular shape of the downcomers and the transverse arrangement of downcomers on vertically adjacent trays is also shown.

Multiple downcomer trays are noted for their high capacity. They were, therefore, included in an article entitled "High-Capacity Distillation" published at page 53 of the August 1998 edition of *Hydrocarbon Processing* and in an article starting at page 23 of the January 1999 edition of *Chemical Engineering Process*. These articles show the transverse arrangement of the downcomers on vertically adjacent trays and describe the flow of vapor and liquid through fractionation columns employing the trays.

Liquid which falls from the bottom of a downcomer of a multiple downcomer tray will fall onto the active vapor-liquid contacting area of the next lower tray. Therefore the area under the downcomer may be employed to perform vapor-liquid contacting. It has been recognized in the art that the liquid falling on the decking could penetrate the decking thus bypassing the intended vapor-liquid contacting. U.S. Pat No. 5,209,875 introduced the use of antipenetration pans suspended between the trays to reconcile this problem. The antipenetration pans are located under the liquid outlets of the upper tray and oriented perpendicular to the downcomers of the lower tray. Liquid exiting the downcomers falls upon the pans and then flows onto the decking of the lower tray.

BRIEF SUMMARY OF THE INVENTION

The invention is a novel apparatus designed to increase the efficiency of fractionation columns which contain multiple downcomer fractionation trays. The apparatus comprises a liquid distribution pan suspended between vertically adjacent trays which are mounted transverse to each other. The distribution pan collects liquid emanating from the terminal portion of the downcomer of the upper tray and then discharges onto a desired point or area of the active decking area of the next lower tray. The liquid falls upon the lower tray at a more uniform distance from the outlet downcomer of the lower tray, and the liquid has a more uniform residence time upon the tray, thus increasing the separation efficiency of the tray.

One broad embodiment of the invention may be characterized as a tray for performing fractional distillation in a vertical enclosed fractionation column, the tray having at least one trough-like downcomer extending across a central portion of the decking area of the tray, with the tray comprising a downcomer liquid distributor secured to the tray or the next lower tray at a location below openings in the bottom of each terminal portion of the downcomer, said liquid distributor comprising means for intercepting liquid falling from openings in the bottom of the terminal portion of the downcomer and discharging the intercepted liquid beyond the associated end of the downcomer.

BRIEF DESCRIPTION OF THE DRAWING

FIG. 4 shows an overhead view of the liquid distributor 13 of FIG. 3.

FIG. 5 shows an overhead view of an alternative T-shaped design of the liquid distributor 13 of FIG. 3.

FIG. 6 shows an end view looking into a shallow configuration of the liquid distributor 11 of FIG. 2.

FIG. 7 shows an end view looking into an alternately shaped distributor 11 of FIG. 2.

FIG. 8 shows an end view of another alternative liquid distributor chute 11 of FIG. 2.

FIG. 9 is an end view looking into the outlet of a very shallow distributor 11.

FIG. 10 is an overhead view of the distributor of FIG. 9.

FIG. 11 shows an overhead view of a bipedal form of the liquid distributor 11.

FIG. 12 shows an overhead view of a variation of the bipedal liquid distributor 11 of FIG. 11.

DETAILED DESCRIPTION AND PREFERRED EMBODIMENTS

Figure 1:
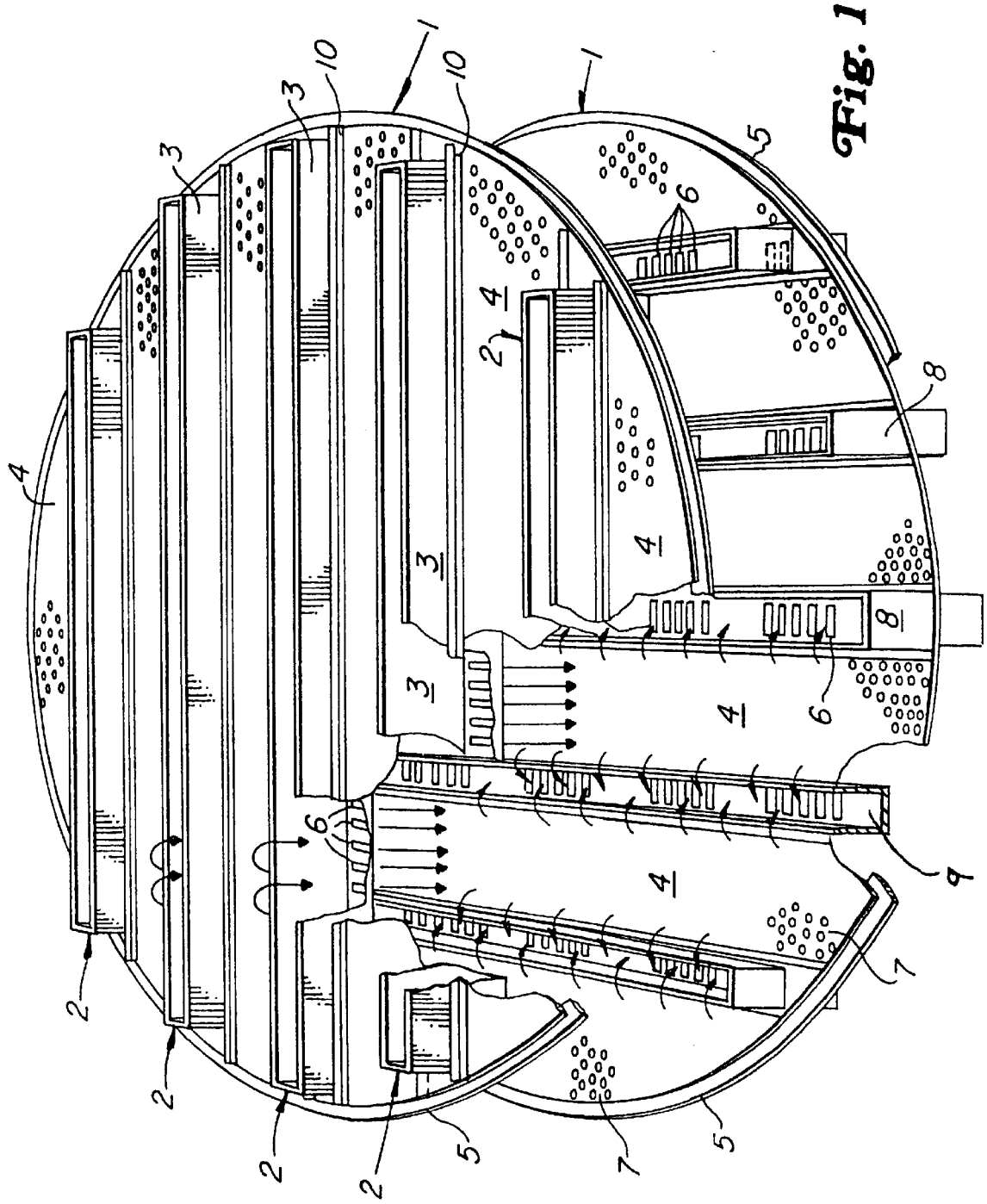
FIG. 1 shows two vertically adjacent multiple downcomer fractionation trays of a fractionation column, with the trays arranged in their customary perpendicular alignment.

Fractionation trays are employed to perform an almost endless variety of separations in the petroleum and petrochemical industries. Fractionation trays are used, for example, in the separation of many different hydrocarbons such as paraffins, aromatics and olefins. Trays are used to separate specific compounds such as alcohols, ethers, alkylaromatics, monomers, solvents, inorganic compounds, etc. and in the separation of broad boiling mixtures such as petroleum derived fractions including naphtha. This great utility has led to the development of a wide variety to trays having differing advantages and disadvantages.

One widely used type of tray is the multiple downcomer tray illustrated in the above cited references. Multiple downcomer trays have several distinguishing physical characteristics. For instance, a multiple downcomer tray does not have the receiving pan traditionally shown on cross-flow trays. This is the normally imperforate section of tray deck located below the bottom of a downcomer. This is the area of a cross flow tray that the liquid descending through the downcomer impacts before passing horizontally onto the perforated decking of the tray. In a conventional tray the receiving pan is normally located directly below the downcomer leading from the next above fractionation tray. This differs from a multiple downcomer tray in which the horizontal surface area of the tray is divided only into areas functioning as downcomer means and flat vapor-liquid contacting area normally referred to as decking. There are no imperforate areas allocated to receiving descending liquid from the tray located immediately above.

Another distinguishing feature of a multiple downcomer type fractionation tray is the provision of a relatively large number of parallel downcomers at equal distances across the tray. Each tray can employ from one to fifteen or more such downcomers, which are of similar design. These downcomers are spaced relatively close together compared to those of the more common crossflow fractionation trays as the downcomers are spread across the surface of the tray rather than being mainly at the periphery of the tray. The distance between adjacent downcomers (measured between their side walls) of the same multiple downcomer tray will be between 0.2 and 1.0 meters and preferably less than about 0.5 meter. This results in a tray having a unique design, when viewed from above, consisting of the alternating decking areas and downcomer means evenly spaced across the upper surface of the fractionation tray.

The structure of the downcomers of a multiple downcomer tray is also unique compared to the downcomers employed upon crossflow, fractionation trays. The fractionation tray. Rather, they stop at a much higher intermediate level located in the cylindrical void volume between the two trays. The downcomer descending from the tray above therefore normally stops well above the deck surface of the lower tray and above the inlet to the downcomers of the tray below. The inlets to the downcomers of a tray functions as the outlet weir of the tray, and the bottom of the downcomer is normally well above the outlet-weir of the lower tray. The horizontal ends-on cross-section of the downcomers can have a wide variety of shapes ranging from rectangular to triangular.

A very distinctive feature of a multiple downcomer fractionation tray is the provision of a liquid sealable means near the bottom of the downcomer. The bottom of the downcomer is sealed sufficiently to retard the direct downward flow of liquid out of the downcomer. This causes the accumulation and retention of froth, allowing it to separate into a clear liquid and released vapor. The accumulated liquid covers the openings in the bottom portion of downcomer and seals the downcomer to the upward flow of vapor. This liquid sealable outlet is located well above the deck of the tray located immediately below. The clear liquid collected in the lower portion of the downcomer spills forth upon the next lower tray through the openings in the bottom of the downcomer. Some liquid may, if desired, exit through openings in the downcomer side walls. The openings are preferably grouped together with the groupings located such that the exiting liquid does not fall into a downcomer of the next lower tray.

Multiple downcomer trays have high vapor and liquid capacities and the ability to function effectively over a significant range of operating rates. Other types of trays, however, tend to have higher efficiencies than multiple downcomer trays. It is postulated that this is caused by the liquid falling from the downspouts of the downcomers landing on the decking of the next lower tray in a manner which leads to a variety of different liquid flow paths and liquid retention times on the tray. This results in part from the preferred transverse arrangement of downcomers on vertically adjacent trays. This transverse arrangement results in the liquid falling from the downcomer downspouts at a number of relatively small spaced apart zones under the overlying downcomers. The spacing between these zones is equal to the spacing between the overlying downcomers, and the liquid must then flow to the downcomer of the lower tray. Some points on the downcomer are closer than others to the areas located directly under the downspouts. It takes the liquid a shorter time to flow the shorter distance to these parts of the outlet downcomer of the lower tray. The resulting non-uniform liquid residence time is known to result in a reduced tray efficiency.

The above description has been primarily in terms of the main decking area of the tray. A similar related problem occurs at the two end or crescent sections of a multiple downcomer tray. This section of the tray has one straight side formed by the downcomer inlet. The major opposing side of this section is the concave surface of the inner wall of the fractionation column, which is substantially the same as the periphery of the tray. Liquid is deposited on the vapor-liquid contacting decking of this section out of only the terminal liquid outlets or downspouts of the downcomer (s) of the next higher tray. It therefore falls at only a few locations and has to spread across the tray in several directions. The liquid near the periphery of the tray may also be stagnant leading to poor tray efficiency, although vapor flow slotting of the decking can be employed to lessen this problem.

It is, therefore, an objective of this invention to provide a multiple downcomer tray having a higher separation efficiency. It is another objective of the invention to provide a multiple downcomer tray in which the length of the liquid flow path is more constant, specially on the terminal sections of the tray. It is a further objective of the subject invention to provide an improved process for separating volatile chemical compounds by fractional distillation.

The subject invention achieves these objectives by the use of a unique liquid collection and redistribution devices. These devices intercept at least a majority of the liquid dropping from the ends of the downcomer of the upper tray before it can impact the decking of the lower tray and then redistributes the liquid onto the decking of the lower tray near the edge of the tray and away from the downcomers of the lower tray. Thus there is provided a liquid flowpath of more uniform length from the point at which the liquid falls upon the decking to the point at which the liquid exits the tray by flowing into the open inlet of the downcomer.

Various efforts in the past to improve the performance of multiple downcomer trays have centered upon the liquid descending from the downcomers and its manner of impact upon the tray decking. For instance, the antipenetration pans referred to above serve to intercept the liquid and distribute it over a wider area such that it does not tend to force its way through the decking perforations resulting in liquid bypassing the lower tray or removing vapor perforations from use. The subject apparatus functions differently. First, it actively collects and retains and transports liquid rather than just intercepting it. This requires the subject device to have a definite walled liquid retention volume. Second, the devices of the subject invention distribute the liquid onto targeted areas of the next lower tray. The liquid is not allowed to simply roll off the subject device in a number of directions as occurs with an antipenetration pan. Rather the liquid is discharged toward the curved edge of the crescent section and flows to the downcomer along a more direct and uniform flow path. The flow paths are more parallel and there are no relatively stagnant areas. Both point and overall tray efficiencies are improved.

The structure and use of the apparatus of the subject invention may be discerned by reference to the Drawing. FIG. 1 of the Drawing is a representation of two vertically adjacent multiple downcomer fractionation trays aligned in the preferred perpendicular arrangement commonly employed in fractionation columns. This is intended to refer to the perpendicular alignment of the downcomers of upper tray 1 to the direction of the downcomers 2 on the lower tray 1. Both trays have a substantially circular periphery which is supported by a ring 5 normally affixed to the inner surface of the fractionation column as by welding. FIG. 1 illustrates the characteristic features of a multiple downcomer fractionation tray including the long trough shaped downcomers extending across the tray, the remainder of the fractionation tray being devoted to decking area 4 and the absence of imperforate areas on the fractionation tray. Each of the rectangular downcomers, a term used in reference to the shape of the internal cross-section of the downcomer 2, is formed from two vertical side walls 3 and two end walls 8. The bottom of the downcomer is closed by a bottom plate 9 having several spaced apart groupings of openings 6 for the outflow of liquid from the downcomer. The decking is secured by a combination support-clamping bar 10.

When employed for fractional distillation, a layer of liquid is retained upon the surface of the decking 4 and aerated by rising vapor passing through the openings 7 in the decking. This operation tends to form a mass of bubbles referred to in the art as froth which moves from the decking areas to the inlets of the downcomer. The froth flows over the upper edge of the downcomer walls and into the downcomers. In the downcomers the froth separates, releasing vapor, which travels upward, and liquid which collects in the downcomers. The liquid then flows out of the downcomer through the downspout openings 6 and is distributed across the decking of the next tray below. While providing a good representation of the structure and arrangement of the elements of a multiple downcomer tray, FIG. 1 somewhat exaggerates the size of certain parts of the tray. For instance, the downcomer walls 3 normally do not extend above the decking surface 4 to the extent shown in the drawing. While such a relatively high inlet weir may be desirable in some instances, it is an atypical situation. It is also noted that the total amount of open area in the bottom of the downcomers provided by the downspout liquid outlets 6 and the size of the vapor perforations 7 in the decking area are both somewhat enlarged.

A close examination of the drawing allows the observation that the groupings of liquid outlets 6 are spaced along the length of the bottom plate 9 of the downcomer 2 in a manner such that the liquid flowing from a downcomer falls only upon decking of the next lower tray. The openings 6 are not located above the inlet of the downcomer of the next lower tray. Therefore, liquid cannot flow directly into the downcomer and bypass the vapor-liquid contacting of the decking area. It may also be discerned from this figure that the liquid egressing a downcomer would tend to fall in a concentrated area of the tray decking and will not be distributed in a uniform pattern or in a manner which provides a uniform length of liquid flow from the point of impact to the exit downcomer.

Figure 2:
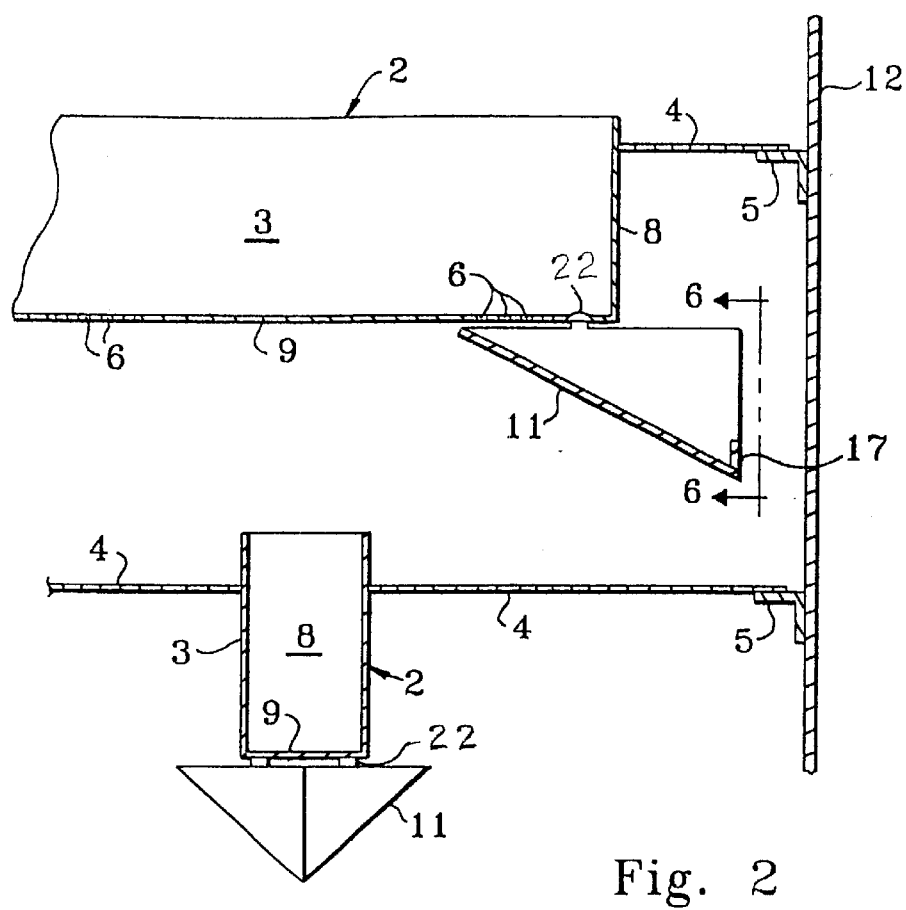
FIG. 2 shows an expanded view of a terminal portion of a downcomer near the vertical cylindrical wall of the column.

FIG. 2 illustrates sections of two vertically adjacent fractionation trays located near the cylindrical outer wall 12 of the fractionation column. The upper tray and the lower tray are both supported by the ring 5 attached to the wall 12. A section of decking 4 extends between the ring 5 and the downcomer 2 of each tray. The two trays are identical. However, they appear quite different due to the fact that the downcomers are aligned perpendicular on the two trays. The downcomer 2 of the upper tray 1 is aligned with its major access extending across the figure such that the inner surface of the lengthy side wall 3 is shown. On the bottom tray the direction of the downcomer is such that it is seen in cross-section showing its box-like rectangular structure and the inner surface of the end plate 8 is visible. Both downcomers also comprise a single bottom plate 9 which has a number of groupings of liquid spouts 6 to allow the discharge of liquid from the downcomer.

The terminal portion of the upper downcomer shown in FIG. 2 includes a terminal grouping of liquid outlet spouts 6. A chute style liquid distributor 11 is attached to the bottom plate 9 by a tab 22. The liquid which flows out of the downcomer through the terminal grouping of liquid downspouts 6 flows into the first end of the distributor 11 and then flows downward along the bottom of the distributor to the outlet end. It therefore travels toward the column wall 12 past the endplate 8 of the downcomer to a location near the periphery of the lower second column. The liquid is therefore conveyed to the periphery of the lower tray and discharged in a direction towards the column wall. As the liquid rushes down the inclined bottom surface of the distributor 11, it will impact a raised lip 17 attached to the bottom of the outlet of the distributor. The lip will tend to cause some liquid to be retained within the distributor such that it overflows and egresses the distributor in a more uniform pattern against the wall 12. The liquid will then fall upon the periphery of the lower tray 2 and travel a relatively uniform flow path directly to the inlet of the downcomer 2 of the next lower tray. It tray be seen from FIG. 2 that if the liquid distributor 11 was not present that the liquid flowing through the terminal grouping of outlet spouts 6 from the upper tray would land on an intermediate point of the decking 4 such that the liquid impacting and residing upon this decking section would have an extremely wide distribution of residence times.

In FIG. 2 the liquid distributor 11 attached to the upper tray is shown in cross section, while the liquid distributor 11 attached to the lower tray is seen head on. Therefore, the open mouth at the second end of the liquid distributor is not seen on the lower tray.

Figure 3:
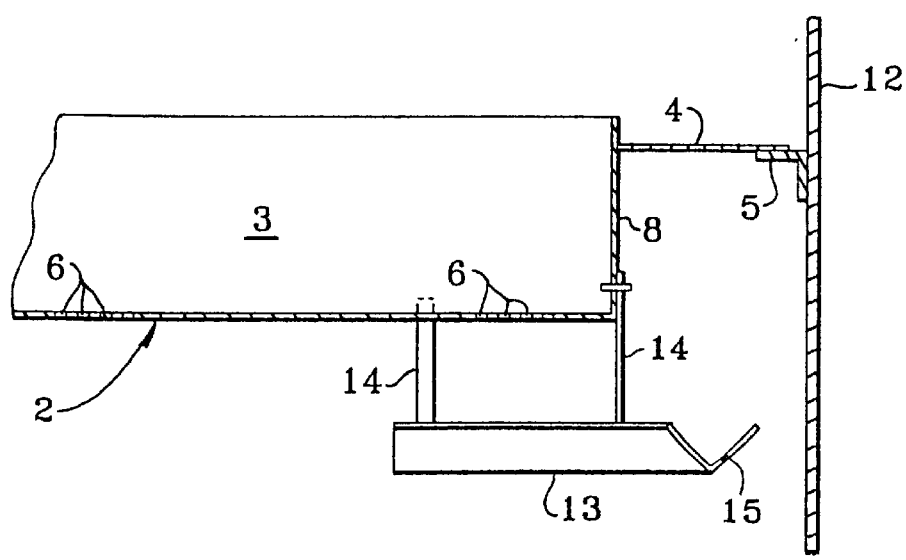
FIG. 3 shows an alternative design of a liquid distributor attached to the end of a downcomer.

FIG. 3 is similar to FIG. 2 but only shows a portion of a single fractionation tray. The major axis of the downcomer 2 is aligned with the plane of the Figure such that the side wall 3 is visible in this Figure. A section of decking 4 extends between a ring 5 attached to the cylindrical wall of the column 12 to the end plate 8 of the downcomer 2. The liquid which is collected in the bottom portion of the downcomer 2 flows out of the downcomer through the groupings of liquid openings 6. The liquid distributor shown in this Figure is T-shaped and comprises a main channel which is parallel to the major axis of the downcomer plus an additional perpendicular end piece. This T-shaped liquid distributor 13 is supported from the downcomer 2 by at least two support straps 14 extending from the distributor to the downcomer. Numerous other support mechanisms for the distributor 13 will readily come to the mind of those skilled in the art. The distributor 13 may be supported from the downcomer, from the decking, from both the decking and the downcomer or may be attached in part to the wall 12 of the column. The distributor could also be totally or partially supported by arms or braces extending from the tray below. Liquid falling from the outlets 6 of the downcomer into the first end of the distributor 13 will flow horizontally to the two branches at the top of the T. The liquid will then flow outward along these two branches and will be discharged from the distributor onto the tray below beyond the end of the downcomer. A row of perforations 15 in the wall of the distributor 13 is provided for the discharge of the liquid. In this manner the liquid is distributed in a relatively uniform manner at a set distance from the inlet to the downcomer of the next lower tray. Those skilled in the art will appreciate that numerous mechanical devices may be employed to allow the liquid to flow from the distributor 13 in a relatively uniform manner. The ends of the two legs of the T may be closed or left open as desired. While the liquid distributor 13 shown in the drawing is triangular, the liquid distributor may have a rectangular or circular cross section. The liquid distributor shown in FIG. 3 is substantially horizontal and therefore parallel to the plane of the tray. However, it could be inclined to promote liquid flow towards the column wall 12. This may be desired when it is intended that the discharged liquid will impact the column wall.

FIG. 4 is the view seen looking downward toward the T-shaped liquid distributor 13 of FIG. 3. This view more clearly illustrates the T shape of the distributor and the location of the outlets 15.

The second end of the distributor 13 can be located adjacent to the wall 12 of the column. A straight second end of the distributor 13 would only be able to make point contact with the curved wall 12 of the column. The second end or top portion of the T of the distributor 13 could accordingly be curved to match the curvature of wall 12.

FIG. 5 illustrates yet another configuration of the T-shaped liquid distributor 13 first introduced in FIG. 3. The distributor has a second end having a number of serrations 16 at an outer edge which allows the liquid to spill over the edge in a number of points along the length of this outlet of the distributor 13. FIG. 6 is the view seen looking into the chute-style liquid distributor 11 shown in FIG. 2. This V-shaped distributor can have a variety of different profiles varying from rather shallow as shown in FIG. 6 to quite deep and narrow as shown in the illustration of FIG. 7.

FIG. 8 illustrates the cross-section of a chute-style liquid distributor 11 having a curved bottom surface and a small horizontal lip or dam at outlet of the distributor. This dam or lip impedes the flow of the liquid out of the distributor such that the flow is distributed more in a horizontal manner against the circumference of the lower tray. FIG. 9 shows the view looking into a different configuration of a chute-style liquid distributor 11. The view seed looking downward towards the same distributor 11 is shown in FIG. 10. The rather shallow distributor 11 of these two figures includes two flow directing walls 18 which divide the collected fluid into several streams which are discharged at different points.

FIGS. 11 and 12 illustrate a bipedal form of the chute-like liquid distributors 11. Liquid which falls from the terminal outlets of the downcomer into the first end of the distributor 11 would flow downward as shown in FIG. 2 toward the two outlets at each foot of the distributor. The distributor 11 of FIG. 12 includes an added means to distribute the liquid in a more uniform manner. A number of notches 20 are located in each of the feet 19 to distribute the liquid both towards the wall of the fractionation column and by means of the terminal notch to further distribute the liquid across the decking of the next lower tray.

A process embodiment of the subject invention may accordingly be characterized as a process for fractional distillation which comprises contacting liquid and vapor on a substantially horizontal decking area of a first fractionation tray retained in a cylindrical column; collecting liquid from the decking area of the first fractionation tray in an elongated downcomer bisecting the decking area, with the downcomer having a central portion and two terminal portions; discharging liquid from the downcomer toward a second fractionation tray having a substantially circular periphery through liquid outlet spouts located in a bottom portion of the downcomer; and collecting liquid being discharged from liquid outlet spouts located in the terminal portions of the downcomer in a liquid distribution device, directing the collected liquid beyond the terminal portion of the downcomer and then discharging the collected liquid from the liquid distribution device onto decking of the second fractionation tray.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the column of the subject process therefore include a temperature in the broad range of from about −50 to about 250 degrees C. The column must be operated at a pressure sufficient to maintain at least a portion of the feed compounds present as a liquid. High pressures require a much more costly outer vessel and accessory equipment including reboilers and overhead condensers. It is, therefore, generally desired to operate a column in the lower portion of the range of possible operating pressures unless it adversely effects the operation of the column. Fractionation pressures may range from subatmospheric pressure to a pressure up to about 500 psig.

The subject invention finds application on or as part of fractionation trays which have at least one downcomer which extends across or bisects a central portion of the decking of the tray. The central portion of the decking is a strip of tray surface running across the tray and separated from edge of the tray on two sides by some part of the tray such as a downcomer. That is, the invention does not find application when the tray employs only "chordal" downcomers of the type found at the edge of a crossflow fractionation tray. Such downcomers often employ the column wall as part of the structure which confines the downward flow of liquid from the tray. Large multi-pass crossflow trays may also have a downcomer in the center of the tray, but the subject invention is primarily directed to multiple downcomer trays. It is not, however, limited to use on this type of tray. Despite its name, a small diameter multiple downcomer tray may have only a single central downcomer extending down the center of the tray. The number of downcomers on a tray increases with the tray's diameter and liquid flow rates. A multiple downcomer tray may have five or more downcomers each of which can employ the subject invention.

The liquid distribution apparatus of the subject invention are used at the ends of the downcomers to direct liquid toward the column wall. The apparatus is therefore not employed under the liquid openings (downspouts) located in the intermediate portion of the downcomer. Therefore each downcomer will have only two of the terminal liquid distributors of the subject invention. In some instances not all downcomers will be outfitted with two terminal liquid distributors. Other forms of liquid distribution means may be attached to the downcomer or the tray in the central portion of the downcomer.

An apparatus embodiment may accordingly be characterized as a fractionation apparatus comprising a multiple downcomer fractional distillation tray and a tray efficiency enhancement apparatus which apparatus comprises a liquid distribution device having a liquid reception area at one end and a liquid discharge opening at the other end connected by an inclined liquid transfer channel, with the liquid reception area being located under liquid downspout openings in a bottom portion of the end of a downcomer of said tray and with the liquid discharge opening being located beyond the end of said downcomer.

What is claimed is:

1. A process for fractional distillation which comprises:
   a.) contacting liquid and vapor on a substantially horizontal decking area of a first fractionation tray retained in a cylindrical column;
   b.) collecting liquid from the decking area of the first fractionation tray in an elongated downcomer bisecting the decking area, with the downcomer having a central portion and two terminal portions;
   c.) discharging liquid from the downcomer toward a second fractionation tray having a substantially circular periphery through liquid outlet spouts located in a bottom portion of the downcomer; and,
   d.) collecting liquid being discharged from liquid outlet spouts located in the terminal portions of the downcomer in a liquid distribution device, transporting the collected liquid beyond the terminal portion of the downcomer in the liquid distribution device and then discharging the collected liquid from the liquid distribution device onto decking of the second fractionation tray.

2. The process of claim 1 further characterized in that collected liquid discharged form the liquid distribution device is directed axially toward the substantially circular periphery of the second fractionation tray.

3. The process of claim 2 further characterized in that a portion of said collected liquid is discharged against said cylindrical column.

* * * * *